(12) United States Patent
Hua et al.

(10) Patent No.: US 11,853,594 B2
(45) Date of Patent: Dec. 26, 2023

(54) NEURAL NETWORK COMPUTING CHIP AND COMPUTING METHOD

(71) Applicant: Huawei Technologies Co., Ltd., Shenzhen (CN)

(72) Inventors: Xingcheng Hua, Hangzhou (CN); Zhong Zeng, Hangzhou (CN); Leibin Ni, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 17/722,890

(22) Filed: Apr. 18, 2022

(65) Prior Publication Data

US 2022/0236909 A1 Jul. 28, 2022

Related U.S. Application Data

(63) Continuation of application No. PCT/CN2020/121928, filed on Oct. 19, 2020.

(30) Foreign Application Priority Data

Oct. 18, 2019 (CN) .......................... 201910995603.2

(51) Int. Cl.
*G06F 3/06* (2006.01)
*G06N 3/063* (2023.01)

(52) U.S. Cl.
CPC .......... *G06F 3/0655* (2013.01); *G06F 3/0604* (2013.01); *G06F 3/0679* (2013.01); *G06N 3/063* (2013.01)

(58) Field of Classification Search
CPC .... G06F 3/0655; G06F 3/0604; G06F 3/0679; G06N 3/063; G06N 3/065; G06N 3/04
See application file for complete search history.

(56) References Cited

U.S. PATENT DOCUMENTS

| 9,910,827 | B2 | 3/2018 | Muralimanohar et al. |
| 11,093,168 | B2* | 8/2021 | Croxford ............... G06N 3/063 |
| 2015/0324687 | A1 | 11/2015 | Buibas et al. |
| 2019/0278600 | A1 | 9/2019 | Frumkin et al. |
| 2021/0117768 | A1* | 4/2021 | Liu ......................... G06N 3/08 |
| 2022/0108150 | A1* | 4/2022 | Zhang .................... G06F 7/483 |
| 2022/0207337 | A1* | 6/2022 | Kim ...................... G06N 3/063 |

FOREIGN PATENT DOCUMENTS

| CN | 108334942 A | 7/2018 |
| CN | 109657787 A | 4/2019 |

OTHER PUBLICATIONS

Shafiee, A., et al., "ISAAC: A Convolutional Neural Network Accelerator with In-Situ Analog Arithmetic in Crossbars," 2016 ACM/IEEE 43rd Annual International Symposium on Computer Architecture, 2016, 13 pages.

(Continued)

*Primary Examiner* — Zhuo H Li
(74) *Attorney, Agent, or Firm* — Conley Rose, P.C.

(57) ABSTRACT

A neural network computing chip includes a translation circuit and a computing circuit. After input data is processed by the translation circuit, a value of each element of the data input into the computing circuit is not a negative number, thereby meeting a value limitation condition imposed by the computing circuit on the input data.

20 Claims, 11 Drawing Sheets

(56) References Cited

OTHER PUBLICATIONS

Cai, F., et al., "A fully integrated reprogrammable memristor CMOS system for efficient multiply accumulate operations," Computer Science, Nature Electronics, Published Jul. 1, 2019, 10 pages.

Wu, T., et al., "14.3 A 43pJ/Cycle Non-Volatile Microcontroller with 4.7 us Shutdown/Wake-up Integrating 2.3-bit/Cell Resistive RAM and Resilence Techniques," 2019 IEEE International Solid-State Circuits Conference—(ISSCC), IEEE, 2019, 5 pages.

Mochda, R., et al., "A 4M Synapses integrated Analog ReRAM based 66.5 TOPS/W Neural-Network Processor with Cell Current Controlled Writing and Flexible Network Architecture," 2018 IEEE Symposium on VLSI Technology, 2018, 2 pages.

Chiu, Y-C., et al., "A 40nm 2Mb ReRAM Macro with 85% Reduction in Forming Time and 99% Reduction in Page-Write Time Using Auto-Forming and Auto-Write Schemes," 2019 Symposium on VLSI Technology, 2019, 2 pages.

Chen, W-H., et al., "A 65nm 1Mb nonvolatile computing-in-memory ReRAM macro with sub-16ns multiply-and-accumulate for binary DNN AI edge processors," 2018 IEEE International Solid-State Circuits Conference—(ISSCC), 2018, 3 pages.

Canziani, A., et al., An Analysis of Deep Neural Network Models for Practical Applications, arXiv:1605.07678v4 [cs.CV], Apr. 14, 2017, 7 pages.

Li, C., et al., "Analogue signal and image processing with large memristor crossbars," Nature Electronics, vol. 1 Jan. 2018, pp. 52-59.

Chen, W-H., et al., "CMOS-integrated memristive non-volatile computing-in-memory for AI edge processors," Nature Electronics, vol. 2, Sep. 2019, pp. 420-428.

Future Think Tank, "Edge Computing AI Chip Topics: Pay attention to talents, capital, Three elements of the scene, from snowball," Aug. 22, 2019, 44 pages, with the English Translation.

DeepTech, "Why does Zhicun Technology become a new entrant to boldly challenge NOR Flash?" Yuanchuang, Aug. 25, 2018, 11 pages, with the English Translation.

Weijia Wang et al, Trained Biased Number Representation for ReRAM-Based Neural Network Accelerators, ACM Journal on Emerging Technologies in Computing Systems, vol. 15, No. 2, Article 15. Pub. date: Mar. 2019, 17 pages.

\* cited by examiner $$\begin{matrix} W_{0,0} & W_{0,1} & * & * & * & W_{0,k-1} \\ W_{1,0} & W_{1,1} & * & * & * & W_{1,k-1} \\ W_{2,0} & W_{2,1} & * & * & * & W_{2,k-1} \\ W_{3,0} & W_{3,1} & * & * & * & W_{3,k-1} \\ * & * & * & * & * & * \\ * & * & * & * & * & * \\ * & * & * & * & * & * \\ W_{j-1,0} & W_{j-1,1} & * & * & * & W_{j-1,k-1} \end{matrix}$$

FIG. 2

NEURAL NETWORK COMPUTING CHIP AND COMPUTING METHOD

CROSS-REFERENCE TO RELATED APPLICATIONS

This is a continuation of International Patent Application No. PCT/CN2020/121928 filed on Oct. 19, 2020, which claims priority to Chinese Patent Application No. 201910995603.2 filed on Oct. 18, 2019. The disclosures of the aforementioned applications are hereby incorporated by reference in their entireties.

TECHNICAL FIELD

This application relates to the neural network computing field, and in particular, to a neural network computing chip and a computing method.

BACKGROUND

As one of important means to implement artificial intelligence, a neural network (NN) has been widely used in fields such as robot, speech recognition, and image recognition. To improve neural network computing efficiency, a common practice in the industry is customizing a computing chip dedicated for the neural network to implement efficient neural network computing.

A chip applied to a neural network is a chip of a crossbar array architecture with integrated storage and computing. A main principle of the chip is constructing a computing array (namely, crossbar array) in the crossbar array chip architecture with integrated storage and computing by using a non-volatile storage device, and storing weight data of the neural network into a storage unit of the crossbar array in a form of electrical conductance. Then, input data is converted into a voltage signal, the voltage signal is loaded onto the crossbar array, and a multiply—accumulate operation is performed on the voltage signal and the weight data stored in the storage unit of the crossbar array to obtain an output result.

A device that forms the storage unit of the crossbar array is usually an embedded flash (eFlash), a resistive random-access memory (RAM) (ReRAM), or the like. Such a storage device requires an input voltage to be a positive voltage, otherwise, the storage unit cannot work normally. Therefore, during a calculation process, data input into the storage unit needs to be a positive number. However, during an actual usage process, input data in the neural network may have a positive number and a negative number. In the other approaches, the input data is split into positive and negative numbers, and then neural network computing of a group of input data is implemented by using a computing array. For example, the input data is split into positive input data including only a positive number and negative input data including only a negative number, absolute values of the positive input data and the negative input data are separately input into the computing array for calculation, and finally, calculation results of the two calculations are aggregated, to obtain a final output result. In the foregoing manner, because two operations need to be performed, a delay is relatively large, and processing efficiency is low.

SUMMARY

This application provides a neural network computing chip and a computing method, to improve neural network processing efficiency.

According to a first aspect, an embodiment of this application provides a neural network computing chip, where the computing chip includes a translation circuit and a computing circuit. The translation circuit is configured to receive first input data including at least two elements, where values of at least one element of the at least two elements are negative numbers, and process the first input data based on preset translation data to obtain second input data, where a value of an element included in the second input data is zero or a positive number. The computing circuit is connected to the translation circuit, and is configured to receive third input data including the second input data and preset bias input data, and perform calculation on the third input data based on preset weight data to obtain a calculation result, where the weight data includes bias weights and initial weights of the computing chip, and the bias weights and the bias input data are obtained based on the translation data, the initial weights, and initial bias data of the computing chip.

In the foregoing technical solution, after input data is processed by using the translation circuit, a value of each element of the data input into the computing circuit is not a negative number, thereby meeting a value limitation condition imposed by the computing circuit on the input data. In addition, because the value of each element in the data input into the computing circuit is not a negative number, a calculation result can be obtained by using the computing circuit to perform calculation for only one time, without a need for the computing circuit to perform calculation for two times. Therefore, neural network computing efficiency is improved, a delay of a neural network operation is reduced, and computing resource consumption may also be reduced.

In a possible design, the computing chip further includes a register configured to store the preset translation data. In this case, the translation circuit may include but is not limited to the following two implementations.

Implementation 1:

The translation circuit is connected to the register, and is configured to receive the first input data and the translation data, and separately perform a summation operation on each element in the first input data and the translation data to obtain the second input data.

In the foregoing technical solutions, the translation circuit needs only to perform the summation operation, so that a processing process of the translation circuit can be simplified.

Implementation 2:

The translation circuit includes a summator and a comparator, where the summator is connected to the register, and is configured to receive the first input data and the translation data, and perform a summation operation on each element in the first input data and the translation data to obtain first intermediate data, and the comparator is connected to the summator, and is configured to compare each element in the first intermediate data with a preset value to obtain the second input data.

In the foregoing technical solutions, the intermediate data output by the summator can be compared with the preset value, to ensure that a value of each element in the second input data is zero or a positive number, thereby improving accuracy of the translation circuit.

In a possible design, the comparator compares each element in the first intermediate data with the preset value to obtain the second input data, where for an element whose value is greater than or equal to the preset value, the comparator outputs a value of the element, and for an element whose value is less than the preset value, the comparator outputs the preset value.

In a possible design, the register is further configured to store the bias input data. The computing chip further includes a data processing circuit, separately connected to the translation circuit and the register, and configured to obtain the third input data based on the second input data and the bias input data. In this case, the computing circuit is connected to the data processing circuit, and is configured to receive the third input data, and perform calculation on the third input data based on the stored weight data to obtain the calculation result.

In the foregoing technical solutions, the third input data can be obtained by using the bias input data stored in the register and the data processing circuit, so that the computing circuit needs only to perform calculation on the third input data, so that a processing process of the computing circuit can be simplified.

In a possible design, the bias weights and the bias input data are obtained by splitting processed bias data according to a preset rule, the preset rule is determined based on a range of input data of the computing circuit and a data range of the initial weights, and the processed bias data is obtained through calculation based on the translation data, the initial weights, and the initial bias data.

In the foregoing technical solutions, translation processing is performed on the input data, and the translation processing causes an output bias. To eliminate the output bias, the bias weights and the bias data used in this embodiment of this application differ from the initial weights and the initial bias data respectively, and a manner of determining the bias weights and the processed bias data is provided.

Further, the processed bias data is split into two parts: the bias weights and the bias input data, so that a bias calculation process is integrated into a weight calculation process, and the computing circuit can obtain the calculation result by performing calculation for one time, thereby reducing computing resource consumption.

In a possible design, the computing circuit includes a computing crossbar array, the computing crossbar array includes a plurality of computing units, and the computing unit includes a resistive memory computing unit.

In a possible design, the resistive memory computing unit includes a ReRAM, a phase change memory (PCM), or a flash memory.

In this embodiment of this application, the computing circuit, the computing crossbar array, and the resistive memory computing unit are not limited.

According to a second aspect, an embodiment of this application provides a neural network computing chip, where the computing chip includes a translation circuit and a computing circuit. The translation circuit is configured to receive first input data including at least two elements, where values of at least one element of the at least two elements are negative numbers, and process the first input data based on preset translation data to obtain second input data, where a value of an element included in the second input data is zero or a positive number. The computing circuit is connected to the translation circuit, and is configured to receive the second input data, and perform calculation on the second input data based on preset initial weights to obtain a first intermediate result, and perform calculation on the first intermediate result based on preset bias data to obtain a calculation result, where the preset bias data is obtained based on the translation data, the initial weights, and initial bias data of the computing chip.

In the foregoing technical solutions, after input data is processed by using the translation circuit, a value of each element of the data input into the computing circuit is not a negative number, thereby meeting a value limitation condition imposed by the computing circuit on the input data. In addition, because the value of each element in the data input into the computing circuit is not a negative number, calculation needs to be performed for only one time instead of being performed for two times by using a computing array. This can improve neural network computing efficiency, and reduce a delay of a neural network operation. Further, because it is not required for a plurality of computing arrays to perform calculation for a plurality of times, computing resource consumption may also be reduced.

In a possible design, the computing chip further includes a register configured to store the preset translation data. In this case, the translation circuit may include but is not limited to two implementations. The two implementations are similar to the two implementations of the translation circuit in the first aspect, and details are not described herein again.

In the foregoing technical solutions, the translation circuit may be implemented in a plurality of manners, thereby improving flexibility of the solution.

In a possible design, the computing circuit includes a computing crossbar array and a bias computing circuit, where the computing crossbar array is connected to the translation circuit, and is configured to receive the second input data, and perform calculation on the second input data based on the stored initial weights to obtain the first intermediate result, where the computing crossbar array includes a plurality of resistive memory computing units, and the bias computing circuit is connected to the computing crossbar array, and is configured to receive the first intermediate result, and perform calculation on the first intermediate result based on the bias data to obtain the calculation result.

In a possible design, the resistive memory computing unit is similar to that in the first aspect, and details are not described herein again.

According to a third aspect, a neural network computing method is provided. The method is performed by the neural network computing chip according to any one of the first aspect or the implementations of the first aspect, to implement functions of the neural network computing chip according to any one of the first aspect or the implementations of the first aspect.

According to a fourth aspect, a neural network computing method is provided. The method is implemented by the neural network computing chip in any one of the second aspect or the implementations of the second aspect, to implement functions of the neural network computing chip in any one the second aspect or the implementations of the second aspect.

According to a fifth aspect, a computer readable storage medium is provided, where the computer readable storage medium stores a computer program, the computer program includes a program instruction, and when the program instruction is executed by a computer, the computer is enabled to perform the method according to either of the third aspect and the fourth aspect.

According to a sixth aspect, a computer program product is provided, where the computer program product stores a computer program, the computer program includes a program instruction, and when the program instruction is executed by a computer, the computer is enabled to perform the method according to either of the third aspect and the fourth aspect.

For beneficial effects of the third aspect to the sixth aspect and the implementations of the third aspect to the sixth aspect, refer to descriptions of beneficial effects of the method in the first aspect or the second aspect and the implementations of the method in the first aspect or the second aspect.

BRIEF DESCRIPTION OF DRAWINGS

FIG. 2 is a schematic diagram of an example of weight data according to an embodiment of this application;

DESCRIPTION OF EMBODIMENTS

To make the objectives, technical solutions and advantages of embodiments of this application clearer, the following further describes the embodiments of this application in detail with reference to the accompanying drawings.

In the embodiments of this application, "a plurality of" means two or more. In view of this, in the embodiments of this application, "a plurality of" may also be understood as "at least two". "at least one" may be understood as one or more, for example, one, two, or more. For example, including at least one means that one, two, or more are included, and the included are not limited. For example, including at least one of A, B, and C means that the included may be A, B, C, A and B, A and C, B and C, or A and B and C. The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects.

Unless otherwise stated, ordinal terms such as "first" and "second" mentioned in the embodiments of this application are used to distinguish between a plurality of objects, and are not intended to limit a sequence, a time sequence, a priority, or an importance degree of the plurality of objects.

To help a person skilled in the art understand the technical solutions in the embodiments of this application, an application scenario in this application is first described.

The embodiments of this application are mainly applied to a neural network system. A neural network may also be referred to as an artificial neural network (ANN), or a neural-like network. In the field of machine learning and cognitive science, the neural network is a mathematical model or a computational model that imitates a structure and a function of a biological neural network (an animal's central nervous system, especially a brain), and is used to estimate or approximate a function. The artificial neural network may include neural networks such as a convolutional neural network (CNN), a deep neural network (DNN), and a multilayer perceptron (MLP).

Figure 1:
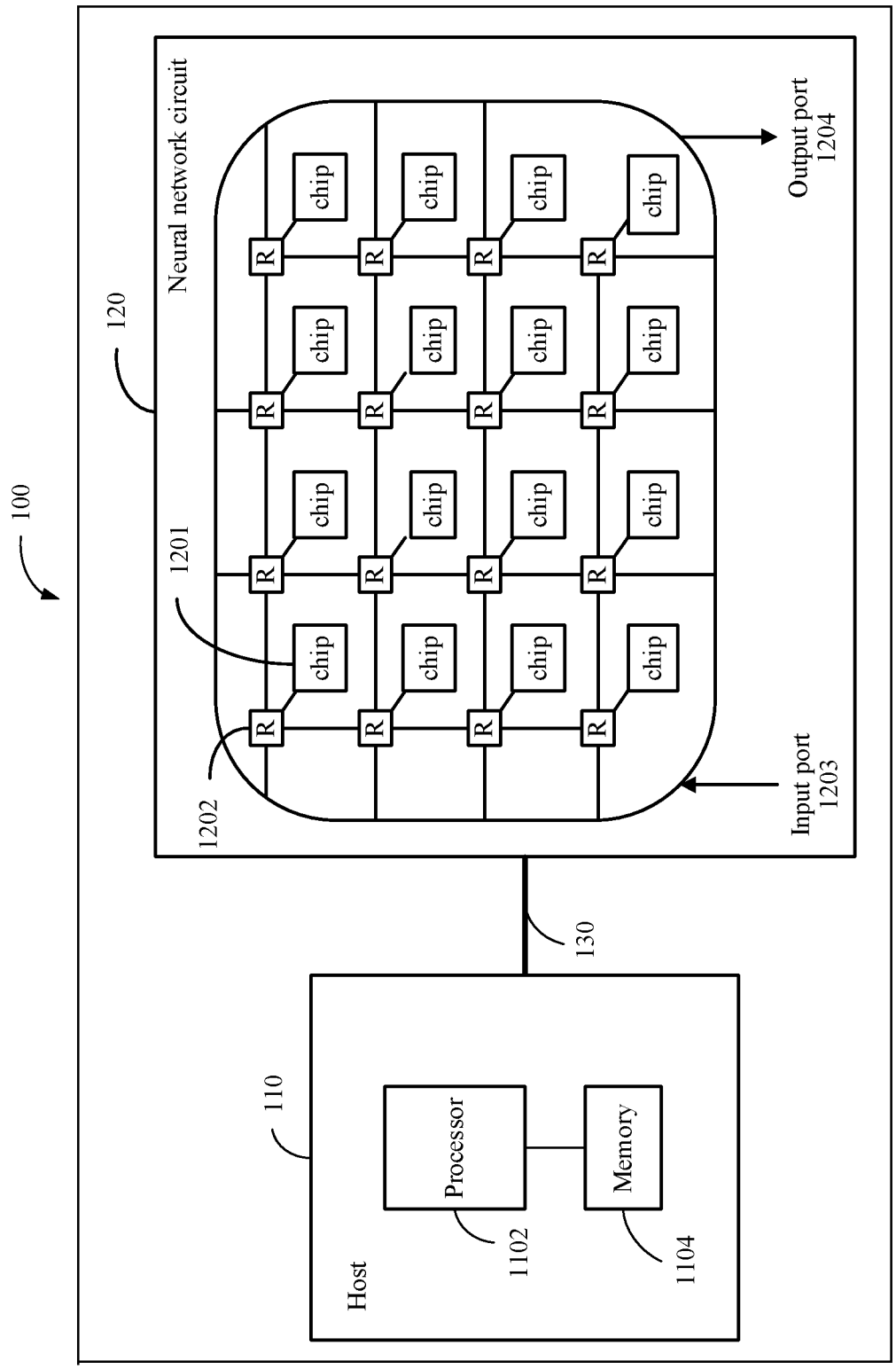
FIG. 1 is a schematic structural diagram of a neural network system according to an embodiment of this application.

FIG. 1 is a schematic structural diagram of a neural network system according to an embodiment of this application. As shown in FIG. 1, the neural network system 100 may include a host 110 and a neural network circuit 120. The neural network circuit 120 is connected to the host 110 through the host interface. The host interface may include a standard host interface and a network interface. For example, the host interface may include a Peripheral Component Interconnect Express (PCIe) interface. As shown in FIG. 1, the neural network circuit 120 may be connected to the host 110 through a PCIe bus 130. Therefore, data may be input into the neural network circuit 120 through the PCIe bus 130, and data processed by the neural network circuit 120 is received through the PCIe bus 130. In addition, the host 110 may monitor a working status of the neural network circuit 120 through the host interface.

The host 110 may include a processor 1102 and a memory 1104. It should be noted that, in addition to the components shown in FIG. 1, the host 110 may further include a communications interface and another component (not shown in FIG. 1) such as a disk used as an external storage. This is not limited herein.

The processor 1102 is an operation core and a control core of the host 110. The processor 1102 may include a plurality of processor cores. The processor 1102 may be a very large-scale integrated circuit. An operating system and another software program are installed in the processor 1102, so that the processor 1102 can access the memory 1104, a cache, a disk, and a peripheral device (for example, a neural network circuit in FIG. 1). It may be understood that, in this embodiment of this application, the core of the processor 1102 may be, for example, a central processing unit (CPU) or another application-specific integrated circuit (ASIC).

The memory 1104 is a main memory of the host 110. The memory 1104 is connected to the processor 1102 through a double data rate (DDR) bus. The memory 1104 is usually configured to store various running software in the operating system, input and output data, information exchanged with an external storage, and the like. To improve an access speed of the processor 1102, the memory 1104 needs to have an advantage of a high access speed. In a conventional computer system architecture, a dynamic RAM (DRAM) is usually used as the memory 1104. The processor 1102 can access the memory 1104 at a high speed by using a memory controller (not shown in FIG. 1), and perform a read operation and a write operation on any storage unit in the memory 1104.

The neural network circuit 120 is a chip array including a plurality of neural network chips (chip). For example, as shown in FIG. 1, the neural network circuit 120 includes a plurality of neural network chips (chip) 1201 for data processing and a plurality of routers 1202. For ease of description, the neural network chip 1201 in this application is referred to as a chip 1201 in this embodiment of this application. The plurality of chips 1201 are connected to each other through the routers 1202. For example, one chip 1201 may be connected to one or more routers 1202. The plurality of routers 1202 may form one or more network topologies. Data transmission may be performed between the chips 1201 by using the plurality of network topologies.

The neural network system may include a plurality of neural network layers, and FIG. 1 shows only one neural network layer. Data may be input to each neural network layer through an input port 1203, and then a calculation result of the neural network layer is output to a next neural network layer through the output port 1204. In this embodiment of this application, the neural network layer is a logical layer concept, and the neural network layer may include a convolutional layer, a pooling layer, and the like (not shown in FIG. 1). A neural network layer means that a neural network operation needs to be performed for one time. Computing of each layer of neural network is implemented by computing units included in the chip 1201.

In this embodiment of this application, the computing units included in the chip 1201 includes two parts: a first computing unit and a second computing unit. The first computing unit is configured to perform calculation on input data based on weight data of the neural network, and the second computing unit is configured to perform bias processing on a calculation result of the first computing unit. The first computing unit currently uses a storage-computing integrated crossbar array architecture, and may be, for example, an eFlash crossbar array, a non-volatile flash (e.g., NOR flash) crossbar array, or a ReRAM crossbar array. The weight data of the neural network may be configured in the first computing unit before calculation. After being processed by the first computing unit and the second computing unit, the input data may be directly sent to a next neural network layer for pipeline calculation.

The weight data is usually used to indicate importance of the input data to output data. In the neural network, the weight data is usually represented by a real matrix. FIG. 2 is a schematic diagram of an example of weight data. In FIG. 2, the weight data is a matrix of j rows and k columns, and each element in the matrix represents a weight value. It should be noted that one neural network layer may include one or more pieces of weight data shown in FIG. 2. This is not limited herein.

Figure 3:
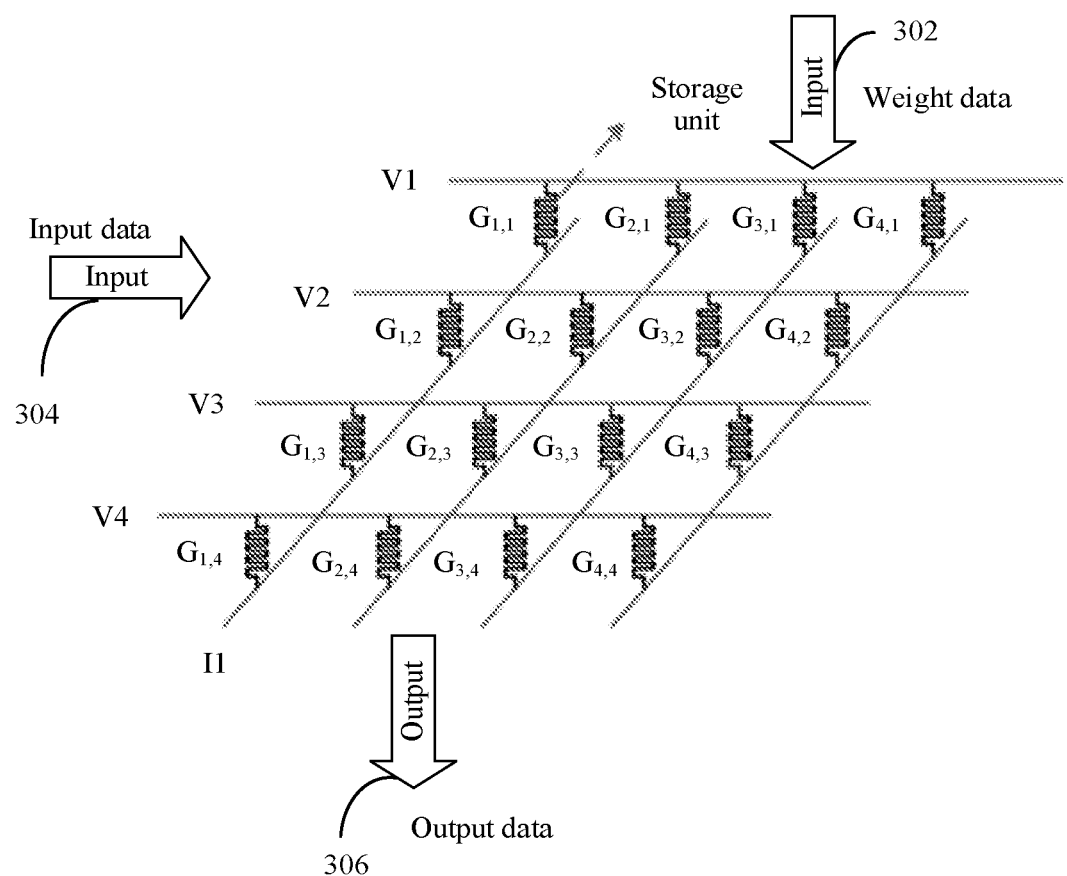
FIG. 3 is a schematic structural diagram of an example of a first computing unit according to an embodiment of this application.

FIG. 3 is a schematic structural diagram of an example of a first computing unit according to an embodiment of this application. For ease of description, the first computing unit is referred to as a crossbar array in the following for description. As shown in FIG. 3, the crossbar array includes a plurality of bit lines (as shown by an input port 302 in FIG. 3) and a plurality of word lines (as shown by in input port 304 in FIG. 3) to form a cross structure. Each cross between a word line and a bit line includes a storage unit (or a cell), such as $G_{1,1}$ or $G_{2,1}$. The plurality of cells form a neural network matrix.

In this embodiment of this application, a weight in the first computing unit may be configured in advance. Further, each element in a weight matrix is configured in a cell of a corresponding crossbar array, so that a matrix multiply-add operation on input data and configured weight data may be implemented by using the crossbar array. For clear description, the following briefly describes how a crossbar array implements a matrix multiply-add operation.

Further, in a process of configuring a neural network, the weight data shown in FIG. 2 may be input into the crossbar array from the bit lines of the crossbar array shown in FIG. 3, so that each element of the weight matrix is configured into a corresponding cell. For example, a weight element $W_{0,0}$ in FIG. 2 is configured in $G_{1,1}$ in FIG. 3, and a weight element $W_{1,0}$ in FIG. 2 is configured in $G_{2,1}$ in FIG. 3. Each weight element in the weight matrix corresponds to one cell. During neural network computing, input data is input to the crossbar array through the word lines of the crossbar array. It may be understood that the input data may be converted into a voltage signal by using a digital-to-analog converter (DAC), and the voltage signal is input into the crossbar array, so that a point multiplication operation on the input data and a weight value configured in the cell is implemented. An obtained calculation result is output in a voltage form to a second computing unit (not shown in FIG. 3) from an output end (for example, an output port 306 shown in FIG. 3) of each column of the crossbar array. Bias data of the neural network is prestored in the second computing unit prestores, and the second computing unit performs an addition operation on the received calculation result and the bias data, to obtain an output result corresponding to the input data, and the output result is converted into a digital signal by using an analog-to-digital converter (ADC).

In the crossbar array shown in FIG. 3, the cell may be implemented by an eFlash, a NOR flash, a ReRAM, or the like. When an input signal includes a negative number, the eFlash does not work, and a resistance value of the ReRAM changes. Therefore, when a neural network operation is performed by using the crossbar array shown in FIG. 3, the input data cannot include a negative number. In this case, when the input data includes a negative number, a solution is to dispose two crossbar arrays. One crossbar array is used to map a weight value whose value is a positive number, and the other crossbar array is used to map a weight value whose value is a negative number. Then, the input data is split into a first matrix that retains only an element whose value is a positive number in the input data, and a second matrix that retains only an absolute value of an element whose value is a negative number in the input data, and the first matrix and the second matrix are separately input into the two crossbar arrays to obtain two calculation results corresponding to the first matrix, and two calculation results corresponding to the second matrix. Finally, aggregation processing is performed on the four calculation results, and an aggregation result is output to the second computing unit. After the second computing unit performs bias processing on the aggregation result, an output result of the neural network for the input data is obtained. In the foregoing method, when the input data includes a positive number and a negative number, two operation processes are required for obtaining, by using a neural network operation, an output result corresponding to the input data, and a delay is relatively large.

Figure 4:
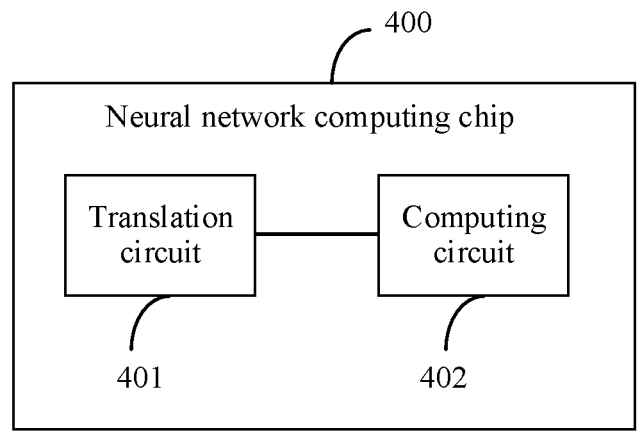
FIG. 4 is a schematic diagram of an example of a neural network computing chip according to an embodiment of this application.

In view of this, an embodiment of this application provides a neural network computing chip, to improve neural network computing efficiency, and reduce a computation delay. FIG. 4 is a schematic diagram of an example of a neural network computing chip 400 according to an embodiment of this application. The neural network computing chip 400 may be the chip 1201 or a module in the chip 1201, for example, may be a computing unit of the chip 1201. This is not limited herein. It should be noted that a neural network system includes a plurality of neural network layers, and the neural network computing chip 400 may be understood as a computing unit in a computing node of a neural network layer.

As shown in FIG. 4, the neural network computing chip 400 includes a translation circuit 401 and a computing circuit 402. The translation circuit 401 stores preset translation data used to perform translation processing on input data. For example, the translation data may be 4, 8, or 12. After receiving first input data, the neural network computing chip 400 processes the first input data by using the translation data in the translation circuit 401, to obtain second input data. In this embodiment of this application, a quantity of elements in the first input data is not limited. The first input data may include one element, or may include a plurality of elements. In this embodiment of this application, for ease of describing a process of processing input data that includes both an element of a positive number and an element of a negative number, a description is given by using an example in which the first input data includes at least two elements and a value of at least one element is a negative number. After the translation circuit 401 processes the first input data, a value of each element in the obtained second input data is zero or a positive number. The translation circuit 401 inputs the second input data into the computing circuit 402, and the computing circuit 402 obtains a calculation result based on stored preset weight data and the second input data.

In the neural network computing chip 400, after input data is processed by using the translation circuit 401, a value of each element of the data input into the computing circuit 402 is not a negative number, thereby meeting a value limitation condition imposed by the computing circuit 402 on the input data. In addition, because the value of each element in the data input into the computing circuit 402 is not a negative number, calculation needs to be performed for only one time instead of being performed for two times by using a computing array. This can improve neural network computing efficiency, and reduce a delay of a neural network operation. Further, because it is not required for the computing array to perform calculation for a plurality of times, computing resource consumption may also be reduced.

The following separately describes the translation circuit 401 and the computing circuit 402.

Figure 5A:
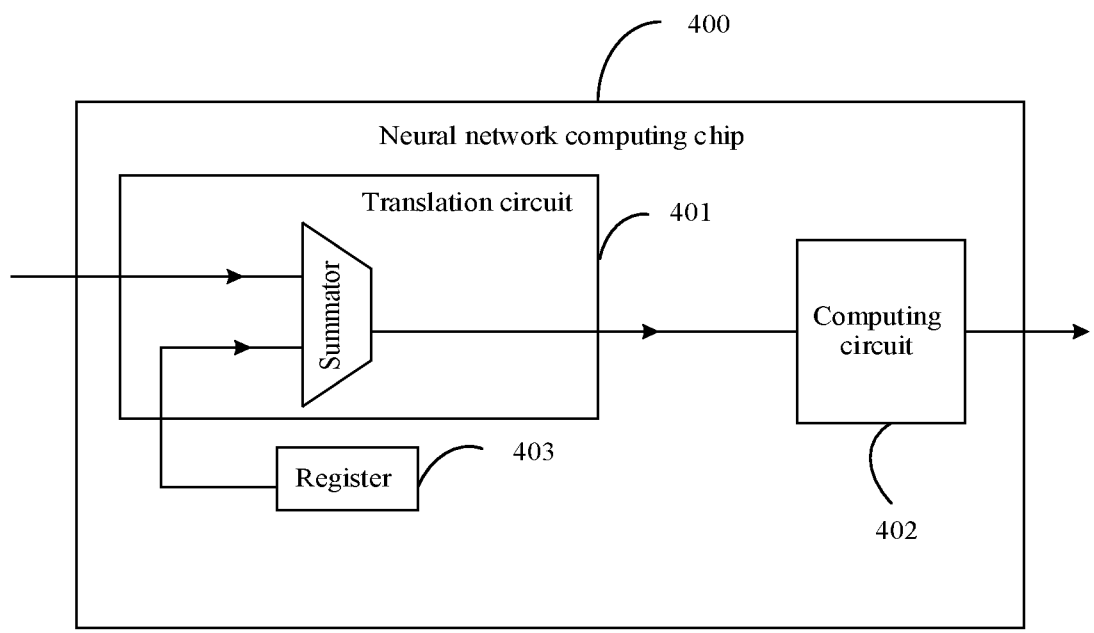
FIG. 5A is a schematic diagram of an example of a translation circuit according to an embodiment of this application.

The translation circuit 401 is first described. In an example, refer to FIG. 5A. The neural network computing chip 400 further includes a register 403, and the register 403 stores the preset translation data. The translation circuit 401 is connected to the register 403, and is configured to receive the first input data and the translation data in the register 403, and separately perform a summation operation on each element in the first input data and the translation data to obtain the second input data. In an example, the translation circuit 401 may be implemented by using a summator. The summator includes two input ends (which are a first input end and a second input end respectively) and an output end, the first input end is configured to input first input data, and the second input end is connected to the register 403. The summator receives the first input data by using the first input end, and obtains the preset translation data from the register 403 by using the second input end, to perform a summation operation on each element in the first input data and the preset translation data, and outputs, by using the output end of the summator, the second input data obtained after the summation operation to the computing circuit 402.

For example, if the first input data is a vector [−4, 1, 2], and the preset translation data stored in the register 403 is 4, the second input data obtained after translation processing is performed by using the translation circuit 401 is a vector [0, 5, 6].

Figure 5B:
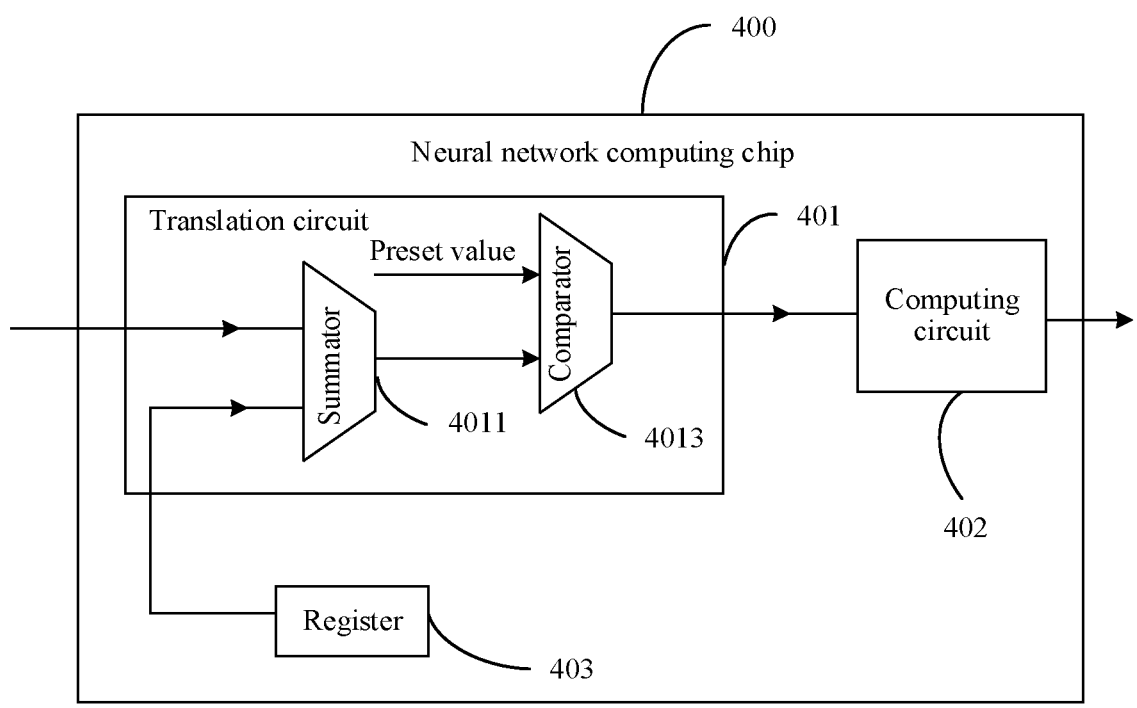
FIG. 5B is a schematic diagram of another example of a translation circuit according to an embodiment of this application.

To further ensure that the value of each element in the second input data output by the translation circuit 401 is not a negative number, this embodiment of this application provides another example of the translation circuit 401. Refer to FIG. 5B. In FIG. 5B, the translation circuit 401 includes a summator 4011 and a comparator 4012. The summator 4011 is connected to the register 403, and is configured to receive the first input data and the translation data, and separately perform a summation operation on each element in the first input data and the translation data to obtain first intermediate data. The comparator 4012 is connected to the summator 4011, and is configured to compare each element in the first intermediate data with a preset value to obtain the second input data. In an example, the comparator 4012 includes two input ends (which are a third input end and a fourth input end respectively) and an output end. A fixed preset value, for example, 0, is input at the third input end, and the fourth input end is connected to an output end of the summator 4011. The comparator 4012 receives the first intermediate data through the fourth input end, and compares each element in the data input at the fourth input end with the preset value. For an element whose value is greater than or equal to the preset value, the comparator 4012 outputs a value of the element, and for an element whose value is less than the preset value, the comparator 4012 outputs the preset value, and outputs the second input data to the computing circuit 402 through the output end.

For example, if the first input data is a vector [−5, 1, 2], and the preset translation data stored in the register 403 is 4, the first intermediate data obtained after a summation operation is performed by using the summator 4011 is a vector [−1, 5, 6]. Then the first intermediate data is input into the comparator 4012, and a preset value in the comparator 4012 is 0. The comparator 4012 determines that a value of the first element in the first intermediate data is less than 0, and the comparator 4012 adjusts an output value corresponding to the first element to 0. Values of both the second element and the third element are greater than 0, and the values keep unchanged. Therefore, it is obtained that the second input data is a vector [0, 5, 6].

Figure 6:
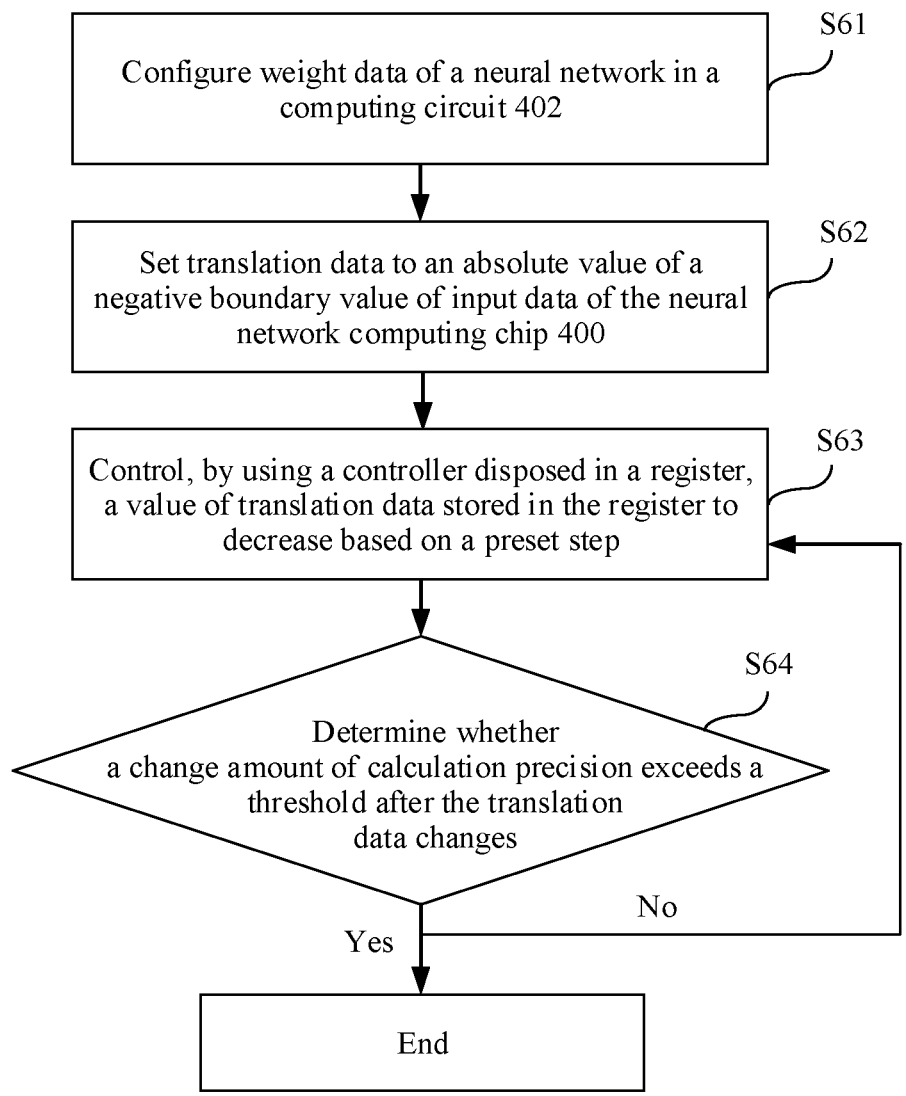
FIG. 6 is a flowchart of an example of an optimization mechanism according to an embodiment of this application.

It should be noted that, the translation circuit 401 converts each element in the input data into a non-negative number by using the preset translation data. The preset translation data may be determined by a person skilled in the art based on an empirical value (for example, based on values of actual historical input data), or certainly, may be obtained in another manner. This is not limited herein. However, when the preset translation data is excessively large, the second input data is relatively large, causing a relatively large output bias, which is inconducive to bias processing. Therefore, in this embodiment of this application, an optimization mechanism is provided to obtain optimal translation data. The optimal translation data may be understood as translation data whose output bias caused by input translation is minimized while calculation precision of the neural network computing chip 400 is ensured. FIG. 6 is a flowchart of the optimization mechanism. The flowchart is described as follows.

S61: Configure weight data of a neural network in the computing circuit 402.

S62: Set the translation data to an absolute value of a negative boundary value of the input data of the neural network computing chip 400. Assuming that input data of the neural network computing chip 400 is 8-bit data (a quantity of bits of the input data is not limited in this embodiment of this application), a value range of the input data is $[-2^7$ to $+2^7-1]$, and the negative boundary value of the input data is $-2^7$. To change all the input data input into the neural network computing chip 400 to non-negative numbers, a largest value of the translation data is an absolute value of the negative boundary value, which is $2^7=128$. Then, test data in a preset test set is sequentially input into the neural network computing chip 400, to obtain calculation precision of the neural network computing chip 400. For example, the test set includes 50 pieces of speech data, the speech data is converted into a digital signal, and the digital signal is input to the neural network computing chip 400, to obtain recognition results of the 50 pieces of speech data. A correctness rate of the 50 recognition results is the calculation precision of the neural network computing chip 400, for example, 100%.

S63: Control, by using a controller disposed in the register, the value of the translation data stored in the register to decrease based on a preset step. For example, if the preset step is 10, the translation data is adjusted from $2^7$ to $(2^7-10)=118$. Again, the test data in the preset test set is sequentially input into the neural network computing chip 400, to obtain calculation precision of the neural network computing chip 400 when the translation data is 118, for example, 98%.

S64: Determine whether a change amount of the calculation precision exceeds a threshold after the translation data changes, where the threshold may be 10%, 15%, or the like. If the threshold is not exceeded, go to step S63, that is, control the value of the translation data stored in the register to decrease based on the preset step. If the threshold is exceeded, the translation data stored in the register is the optimal translation data, and this procedure ends. For example, a difference between the calculation precision of the neural network computing chip 400 when the value of the translation data is 128 and the calculation precision of the neural network computing chip 400 when the value of the translation data is 118 is 2%, which does not exceed the threshold, and step S63 is repeated until a change amount of the calculation precision of the neural network computing chip 400 exceeds the threshold.

After the optimal translation data is determined, when the neural network computing chip 400 performs a neural network operation on the input data subsequently, translation processing is performed on the input data directly by using the optimal translation data.

After the translation circuit 401 is described, the computing circuit 402 is described below.

Because the second input data input into the computing circuit 402 is obtained through translation processing, the translation processing causes an output bias. To eliminate the output bias, the computing circuit 402 is improved. In this embodiment of this application, the computing circuit 402 is improved in two manners. In manner 1, the output bias is processed in a weight data calculation process. In manner 2, the output bias is processed in a bias processing process. The following separately describes the two manners.

Figure 7:
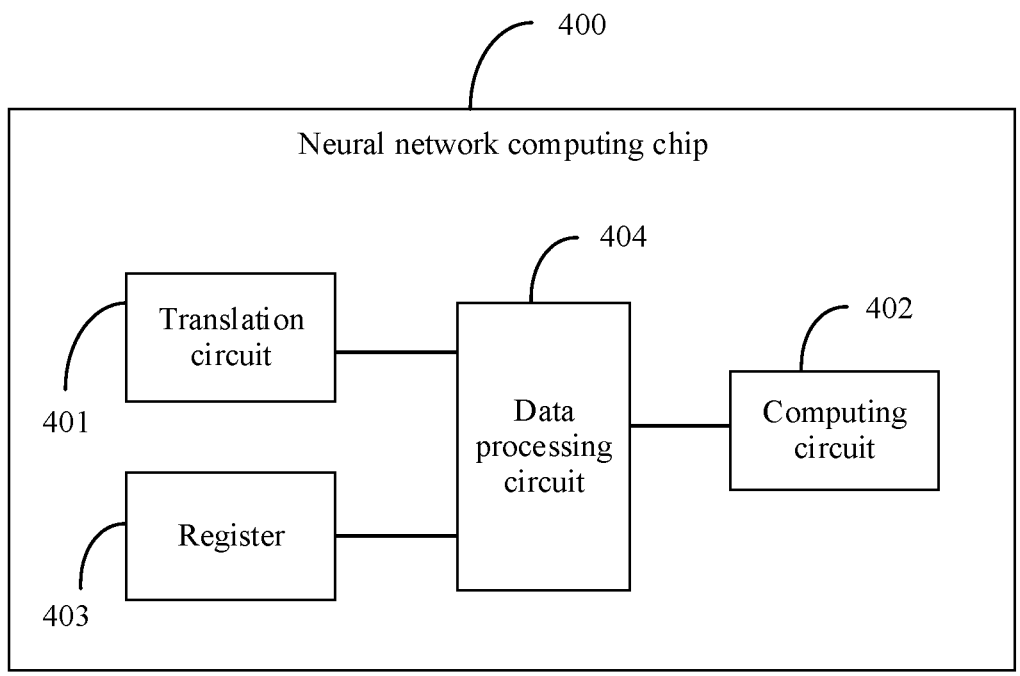
FIG. 7 is a schematic diagram of an example of a computing circuit according to an embodiment of this application.

Manner 1:

Refer to FIG. 7. The register 403 is further configured to store bias input data. The computing chip further includes a data processing circuit 404. The data processing circuit 404 is connected to the translation circuit 401 and the register 403, and is configured to obtain the third input data based on the second input data and the bias input data, and then output the third input data to the computing circuit 402. In an example, the data processing circuit 404 may be implemented by using a synthesizer, and the synthesizer is configured to combine the bias input data and the second input data. For example, if the second input data is a vector [0, 5, 6], and the bias input data stored in the register is a vector [0, 1], the synthesizer combines the second input data and the bias input data, to obtain the third input data: a vector [0, 5, 6, 0, 1], and outputs the third input data to the computing circuit 402.

The computing circuit 402 is connected to the data processing circuit 404, and is configured to receive the third input data, and perform calculation on the third input data based on the stored weight data, to obtain a calculation result. The computing circuit 402 includes a computing crossbar array, and the computing crossbar array includes a plurality of computing units. The computing unit includes a resistive memory computing unit, and the resistive memory computing unit may include a ReRAM) or a PCM, flash memory, or the like, which is not limited herein. In an example, the computing circuit 402 may be the crossbar array shown in FIG. 3, and the crossbar array stores the preset weight data.

It can be learned from the foregoing description of the computing circuit 402 that, in this embodiment of this application, the calculation process of the neural network requires only the weight data in the computing circuit 402 for calculating the third input data to obtain a calculation result. However, it can be learned from the foregoing description of the neural network system shown in FIG. 1 that a computing unit in a neural network system in the other approaches includes a first computing unit that performs calculation on input data based on weight data and a second computing unit that performs bias processing on a calculation result of the first computing unit. It can be learned that the neural network computing chip 400 in this embodiment of this application integrates the bias processing process and the weight calculation process. To be specific, when a multiply—accumulate operation is performed by using the weight data, an addition operation of bias processing on a result of the multiply—accumulate operation is completed, which further reduces a delay of neural network computing.

To integrate the bias processing process and the weight calculation process, in this embodiment of this application, the bias input data stored in the register 403 and the weight data stored in the computing circuit 402 are improved. Further, the bias input data stored in the register 403 and the weight data stored in the computing circuit 402 are obtained based on the translation data in the translation circuit 401, initial weight data of the computing chip, and initial bias data of the computing chip. Further, the initial bias data is processed by using the translation data and initial weights to obtain processed bias data, and then the processed bias data is split according to a preset rule to obtain the bias input data and the weight data. For example, the translation circuit 401 performs a multiplication operation by using the initial weight data of the computing chip and the preset translation data, to obtain a calculation result. Then, a subtraction operation is performed on the initial bias data of the computing chip and the calculation result to obtain the processed bias data. Finally, the processed bias data is split into two parts: the bias input data and bias weights according to a preset rule, where the bias input data is stored into the register 403, the bias weights and initial weight data of the computing chip are used together as the weight data stored in the computing circuit 402.

The following describes the preset rule.

Properly splitting the processed bias data can reduce values of the bias weights, so that occupation of a relatively large quantity of storage arrays is not required for storing the bias weights, thereby reducing storage overheads of the bias weights. In this embodiment of this application, the preset rule is obtained based on a range of the input data of the computing circuit 402 and a data range of the weight data. For example, the computing circuit 402 is a crossbar array, input data of the crossbar array is 8-bit data, and weight data stored in the crossbar array is also 8-bit data. Because the crossbar array requires the input data to be a non-negative number, a range of the input data of the crossbar array is $[0, 2^8-1]$. A data range of the weight data of the crossbar array is $[0, 2^7-1]$. The preset rule includes but is not limited to the following three types.

Preset rule 1:

The processed bias data is split into bias input data of one row and one column and bias weights the same as the processed bias data, where a value of an element in the bias input data is 1.

Figure 8:
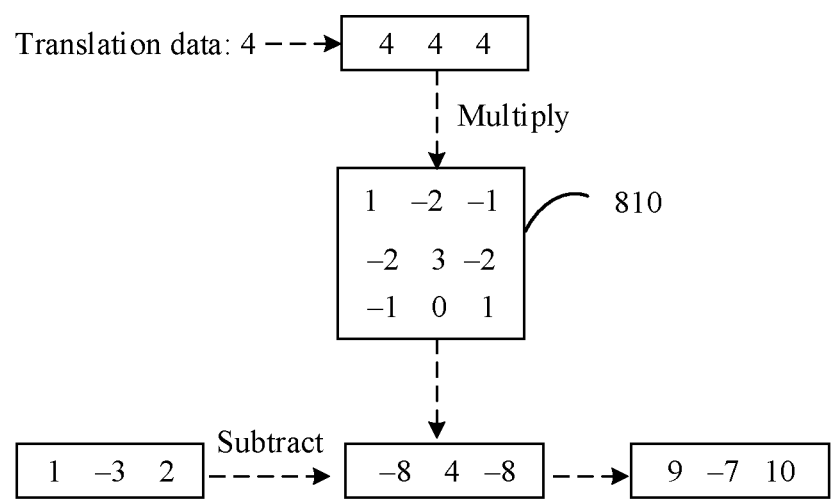
FIG. 8 is a schematic diagram of an example of a method for obtaining bias input data and weight data according to an embodiment of this application.

FIG. 8 is a schematic diagram of a method for obtaining the bias input data and the weight data. It is assumed that the translation data of the computing chip is 4, the initial weight data is a matrix 810, and the initial bias data is a vector [1, −3, 2]. Input data corresponding to the translation data is a vector [4, 4, 4]. A product operation is performed on the vector [4, 4, 4] and the matrix 810 to obtain a calculation result, which is a vector [−8, 4, −8], and then a subtraction operation is performed on the initial bias data and the calculation result, to obtain processed bias data, which is a vector [9, −7, 10]. Then, the vector [9, −7, 10] is split into two parts: bias input data [1] and bias weights [9, −7, 10]. It can be learned that the bias input and the bias weights obtained after the splitting require one row of cells of the crossbar array for storage.

Preset rule 2:

The processed bias data is split into bias input data of two rows and one column and bias weights of two rows and m columns, where a value of an element in data in the first row of the bias input data is 1, and a value of an element in data in the second row of the bias input data is a first threshold. An example in which the first threshold is $2^7$ is used below for description. In addition, a value of an element 1(i) in the first row of the bias weights meets the following formula:

$$S1(i) = \text{sign}(b(i)) * (|b(i)|\%2^7), \quad (1)$$

and
a value of an element S2(i) in the second row of the bias weights meets the following formula:

$$cc * (|b(i)|/2^7), \quad (2)$$

where i is 1, 2, ..., m, m is a positive integer, m is a quantity of columns of the processed bias data, b(i) is an element in the processed bias data, and when a value of b(i) is greater than 0, a value of sign(b(i)) is 1, or when a value of b(i) is less than or equal to 0, a value of sign(b(i)) is −1, where * indicates a multiplication operation, % indicates a remainder operation, and/indicates a division operation.

In an example, the processed bias data is a vector [9, −7, $2^{10}$], absolute values of values of elements are 9, 7, and $2^{10}$, and a largest value of the absolute values is $2^{10}$, which is less than 214. Therefore, a bias input obtained after the splitting is a vector $[1, 2^7]$. Bias weights obtained after the splitting also include two rows, where the first element in the first row is $\text{sign}(9)*(9\%2^7)=(1*9)=9$, the second element in the first row is $\text{sign}(-7)*((7)\%2^7)=((-1)*(7))=-7$, and the third element in the first row is $\text{sign}(2^{10})*((2^{10})\%2^7)=(1*0)=0$. Therefore, the first row of the obtained bias weights is [9, −7, 0], and the first element in the second row is $\text{sign}(9)*(9/2^7)=(1*0)=0$, the second element in the first row is $\text{sign}(-7)*((7)/2^7)=((-1)*(0))=0$, and the third element in the first row is $\text{sign}(2^{10})*((2^{10})/2^7)=(1*8)=8$. Therefore, the second row of the bias weights is obtained [0, 0, 8].

In conclusion, the bias weights obtained by splitting the processed bias data are:

$$\begin{bmatrix} 9 & -7 & 0 \\ 0 & 0 & 8 \end{bmatrix}.$$

It can be learned that the bias input and the bias weights obtained after the splitting require two rows of cells of the crossbar array for storage.

Preset rule 3:

The processed bias data is split into bias input data of (N+2) rows and 1 column and bias weights of (N+2) rows and m columns, where N is a largest value of n, and n meets the following expression:

$$n = \begin{cases} 0, & |b| < 2^{14} \\ \text{ceil}((|b|-2^{14})/(2^8-1)/(2^7-1)), & |b| \geq 2^{14} \end{cases}, \quad (3)$$

ceil( ) is a round-up operation.

Composition of the bias input data and bias weights of (N+2) rows is as follows:

First row: A value of an element in the bias input data is 1, and a value of an element K1(i) in the first row of the bias weights meets the following formula:

$$K1(i) = \text{sign}(b(i)) * \text{sign}(b_{res}) * (\text{abs}(b_{res})\%2^7). \quad (4)$$

Second row: A value of an element in the bias input data is 27, and a value of an element K2(i) in the second row of the bias weights meets the following formula:

$$K2(i) = \text{sign}(b(i)) * \text{sign}(b_{res}) * \text{abs}(b_{res})/2^7. \quad (5)$$

Subsequent n rows: a value of an element in the bias input data is $(2^{8-1})$, and a value of an element Kn(i) of the bias weights meets the following formula:

$$Kn(i) = \text{sign}(b) * (2^7 - 1). \quad (6)$$

Last (N−n) rows: A value of an element in the bias input data is $(2^{8-1})$, and a value of an element in the bias weights is 0. abs( ) is an absolute value operation, and $b_{res}=|b(i)|n*(2^{8-1})*(2^{7-1})$.

In an example, the processed bias data is a vector [9, −7, $2^{15}$], absolute values of values of the elements are 9, 7, and $2^{15}$, and a largest value of the absolute values is $2^{15}$, which is greater than $2^{14}$. Therefore, the bias weights obtained after the splitting include N+2 rows, where the processed bias data includes three elements. It is obtained, according to Formula 3, values of n corresponding to the first element and the second element are 0, and a value of n corresponding to the third element is n=ceil$(((2^{15}−2^{14})/(2^8−1))/(2^7−1))$=ceil$(2^{14}/255/127)$=ceil$(0.51)$=1.

Then, a bias input and bias weights for each row are calculated separately.

For the first row:

A value of an element in the bias input data is 1, and a first element K1(1) of the bias weights is sign(9)*sign(9)*(abs(9)%27)=9, where $b_{res}$=9, the second element K1(2) is sign(−7)*sign(7)*(abs(7)%27)=−7, where $b_{res}$=7, and the third element K1(3) is sign (215)*sign(383)*(abs(383)%27)=127, where $b_{res}$=215−255×127=383. Therefore, the bias weights of the first row are [9, −7, 127].

For the second row:

A value of an element in the bias input data is $2^7$, and the first element K2(1) of the bias weights is sign(9)*sign(9)*(abs(9)/$2^7$)=0, where $b_{res}$=9. The second element K2(2) is sign (−7)*sign(7)*(abs(7)/$2^7$)=0, where $b_{res}$=7. The third element K2(3) is sign (215)*sign(383)*(abs(383)/$2^7$)=2, where $b_{res}$=$2^{15}$−255*127=383. Therefore, bias weights of the second row are [0, 0, 2].

For subsequent N rows (in this example, N=1), calculation is performed by using the foregoing manner of calculating the subsequent n rows and the foregoing manner of calculating the last (N−n) rows. A specific manner is sequentially performing calculation based on a quantity of elements included in a row.

For the first element, according to the formula for the subsequent n rows, a value of an element in the obtained bias input data is $(2^8−1)$, and the first element of the bias weights is 127, according to the formula for the last (N−n) rows, a value of an element in the obtained bias input data is $(2^8−1)$, and the first element of the bias weights is 0. However, n=0 and N−n=1 are obtained through calculation based on the first element in the processed bias data. Therefore, there is no data obtained according to the formula for calculating the subsequent n rows, that is, there is no row whose bias input is $(2^8−1)$ and bias weight is 127, and there is data obtained according to the formula for the last (N−n) rows. To be specific, there is a row whose bias input is $(2^8−1)$ and bias weight is 0.

For the second element, a calculation manner the same as that for the first element is used to obtain that there is no row whose bias input is $(2^8−1)$ and bias weight is 127, but there is a row whose bias input is $(2^8−1)$ and bias weight is 0.

For the third element, a calculation manner the same as that for the first element is used. Because n=1 and N−n=0, it is determined that there is a row whose bias input is $(2^8−1)$ and bias weight is 127, but there is no row whose bias input is $(2^8−1)$ and bias weight is 0.

With reference to calculation results of the first row, the second row, and the subsequent N rows, it is obtained that final bias input data is a vector [1, $2^7$, $2^{8-1}$], and the bias weights are a matrix:

$$\begin{bmatrix} 9 & -7 & 127 \\ 0 & 0 & 2 \\ 0 & 0 & 127 \end{bmatrix}.$$

It can be learned that the bias input and bias weights obtained after the splitting require three rows of cells of the crossbar array for storage.

Figure 9:
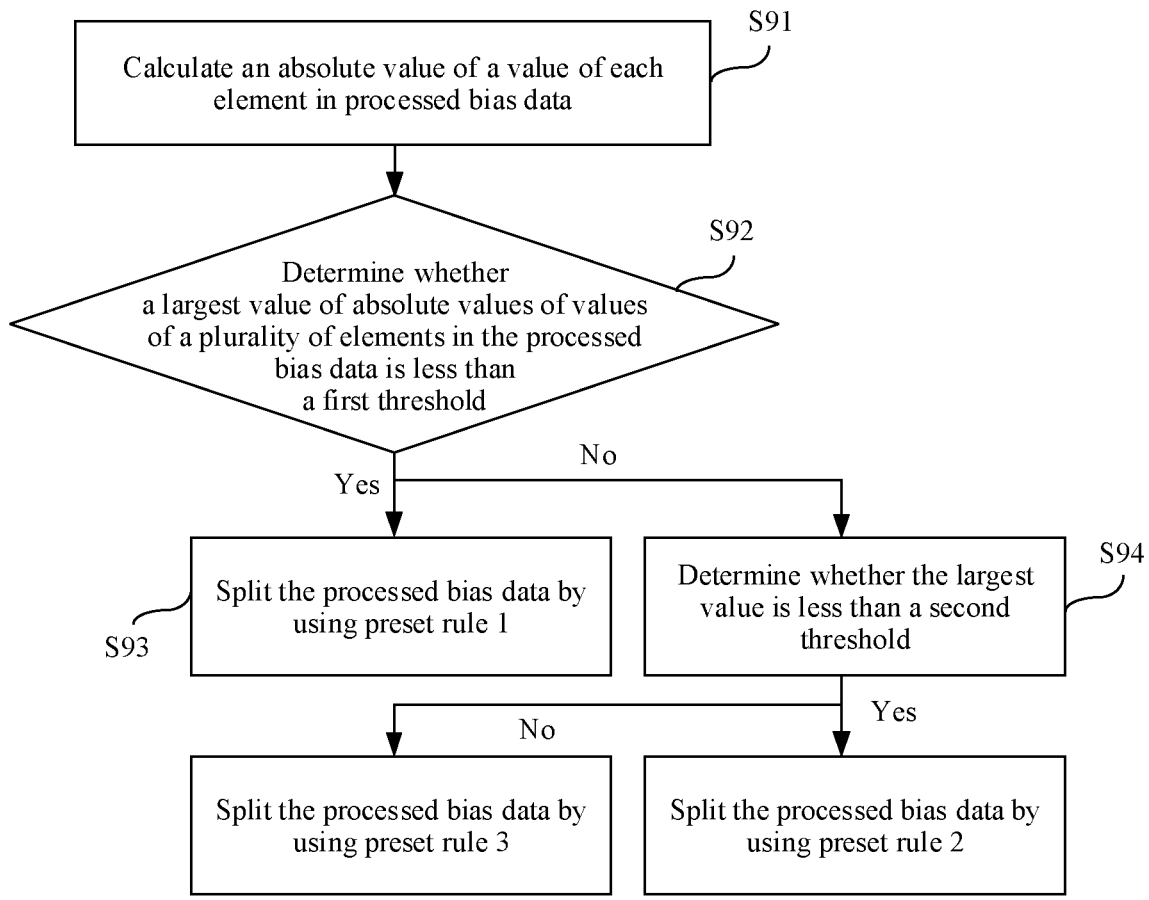
FIG. 9 is a flowchart of splitting processed bias data by using a preset rule according to an embodiment of this application.

In a specific implementation process, the processed bias data is split by using one of the foregoing three preset rules. FIG. 9 is a flowchart of determining a preset rule for splitting processed bias data. Descriptions of the flowchart are as follows.

S91: Calculate an absolute value of a value of each element in the processed bias data, and mark the absolute value as |b|.

S92: Determine whether a largest value $|b|_{max}$ of absolute values of values of a plurality of elements in the processed bias data is less than a first threshold, where the first threshold may be a largest value of values of elements stored in cells, for example, $2^7$.

If the largest value $|b|_{max}$ is less than the first threshold, the processed bias data is split by using preset rule 1, otherwise, step S93 is performed.

S93: Determine whether the largest value $|b|_{max}$ is less than a second threshold, where the second threshold may be a difference between a largest value and a smallest value of the weight data. In this embodiment of this application, values of the weight data are in [−$2^7$+1, $2^7$−1], and the difference between the largest value and the smallest value is approximately $2^{14}$. In the following, the second threshold is set to, for example, $2^{14}$.

If the largest value $|b|_{max}$ is less than the second threshold, the processed bias data is split by using preset rule 2, otherwise, step S94 is performed.

S94: Split the processed bias data by using preset rule 3.

Certainly, the processed bias data may alternatively be split in another manner. This is not limited in this embodiment of this application.

It should be noted that, because electrical conductance of the cell of the crossbar array can only be a positive number, if initial weight data of a neural network layer includes weight data of a negative number, a differential manner may be used for implementation. For example, two columns of cells may be used to respectively map weight data of a positive number and weight data of a negative number. If one piece of weight data is a positive number, weight data is mapped by a cell, corresponding to the element, in the first column of cells, and a high impedance state (which is approximately 0) is mapped to a cell, corresponding to the element, in the second columns of cells. If one piece of weight data is a negative number, a high impedance state is mapped to a cell, corresponding to the element, in the first column of cells, and the weight data is mapped to a cell corresponding to the element in the second column of cells. In this way, after accumulation is performed on currents of each column of cells, weight data of a negative number can be obtained by performing analog domain current subtraction or by performing digital domain subtraction after ADC sampling. In this case, a quantity of cells required for storing the weight data is twice the weights of the neural network.

In addition, the computing circuit 402 in manner 1 may further include a DAC and an ADC. For example, a DAC is disposed between the data processing circuit 404 and the computing circuit 402. The ADC is connected to an input end of the computing circuit 402. If input data is a digital signal, the digital signal is converted into an analog signal by using a DAC, for example, into a voltage signal, and then the analog signal is loaded onto the computing circuit 402. After calculating the analog signal based on the preset weight data, the computing circuit 402 converts, by using the ADC, an output signal (for example, a current signal) of the computing circuit 402 into a digital signal for outputting.

Based on a same invention concept, an embodiment of this application provides a neural network computing method. The method is applied to a neural network computing chip 400 including a translation circuit 401 and the computing circuit 402 shown in FIG. 7.

Figure 10:
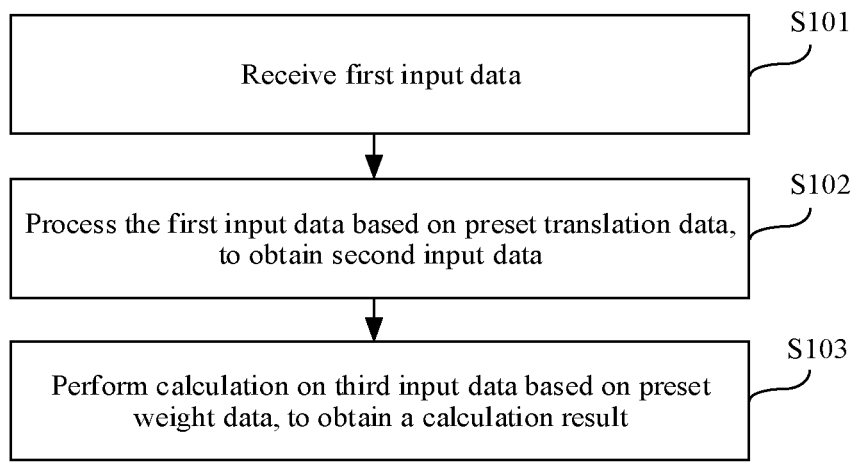
FIG. 10 is a flowchart of an example of a data processing method according to an embodiment of this application.

FIG. 10 is a flowchart of a neural network computing method according to an embodiment of this application. The flowchart is described as follows.

S101: The neural network computing chip 400 receives first input data.

Figure 11:
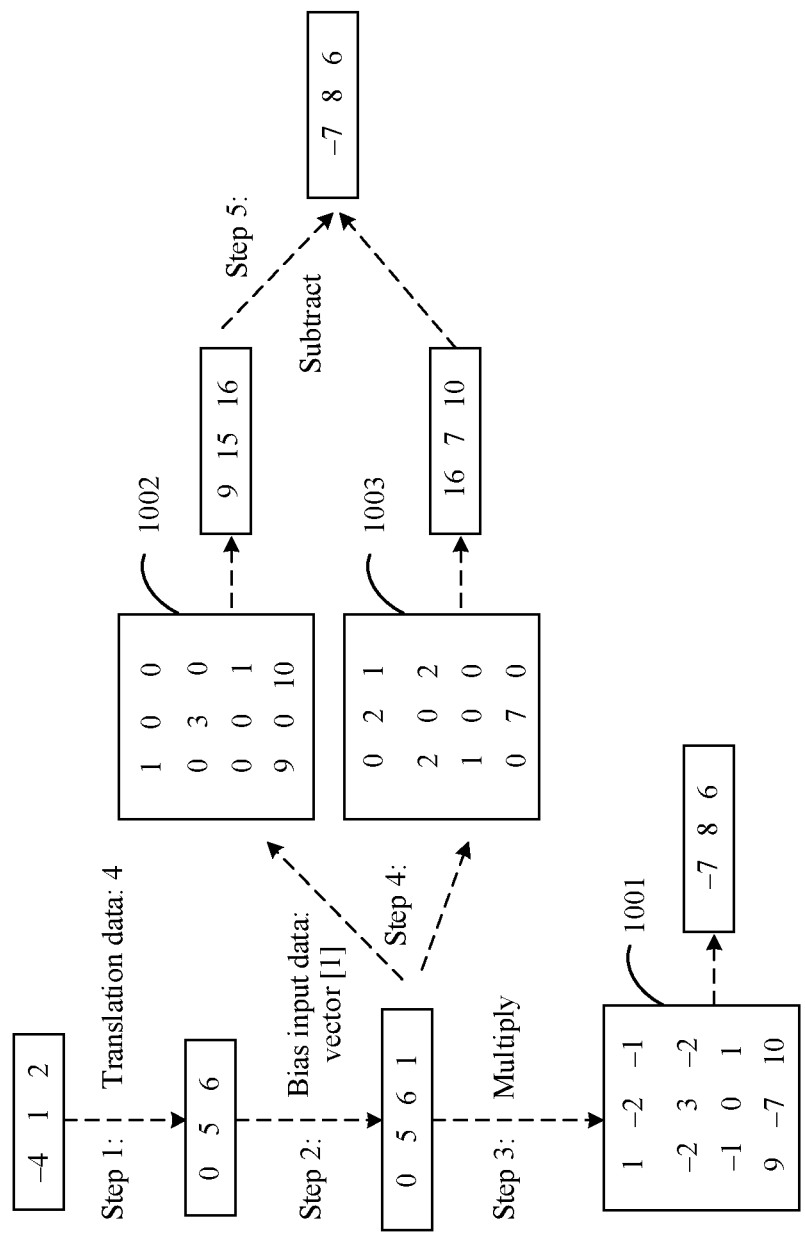
FIG. 11 is a schematic diagram of an example of a data processing method according to an embodiment of this application.

In this embodiment of this application, the first input data includes at least two elements, and values of at least one element of the at least two elements are negative numbers. For example, FIG. 11 is a schematic diagram of processing the first input data by the neural network computing chip 400. In FIG. 10, the first input data is a vector [−4, 1, 2]. The first input data includes three elements. A value of the first element is a negative number, and values of the other two elements are positive numbers.

S102: The neural network computing chip 400 processes the first input data based on preset translation data, to obtain second input data.

In this embodiment of this application, a value of an element included in the second input data is zero or a positive number. Further, manners in which the neural network computing chip 400 obtains the second input data may include but are not limited to the following two manners.

In a first obtaining manner, a summation operation is performed on each element in the first input data and the preset translation data stored in the translation circuit 401 to obtain the second input data. For example, as shown in step 1 in FIG. 11, the preset translation data stored in the translation circuit 401 is 4, and the second input data obtained after translation processing is performed by using the translation circuit 401 is a vector [0, 5, 6].

In a second obtaining manner, the translation circuit 401 performs a summation operation on each element in the first input data and the translation data to obtain first intermediate data, and compares each element in the first intermediate data with a preset value to obtain the second input data.

The neural network computing chip 400 may obtain the second input data in either manner. This is not limited herein.

S103: The neural network computing chip 400 performs calculation on third input data based on preset weight data, to obtain a calculation result.

After the translation circuit 401 of the neural network computing chip 400 outputs the second input data, the computing circuit 402 processes the second input data by using preset bias input data, to obtain the third input data including the second input data and the preset bias input data. For example, as shown in step 2 in FIG. 11, the preset bias input data is a vector [1], and the preset bias input data and the second input data are combined to obtain the third input data: [0, 5, 6, 1]. Then, calculation is performed on the third input data based on the preset weight data in the computing circuit 402. For example, as shown in step 3 in FIG. 11, the preset weight data is a matrix 1001:

$$\begin{bmatrix} 1 & -2 & -1 \\ -2 & 3 & -2 \\ -1 & 0 & 1 \\ 9 & -7 & 10 \end{bmatrix}.$$

A product operation is performed on the third input data [0, 5, 6, 1] and the matrix 1001, to obtain a calculation result: a vector [−7, 8, 6].

In this embodiment of this application, the bias weights and the bias input data are obtained by splitting processed bias data according to a preset rule, and the processed bias data is obtained by processing the initial bias data based on the translation data and the initial weights. The preset rule is obtained based on a range of input data of the computing circuit and a data range of the weight data. A manner of obtaining the bias weights and the bias input data is similar to that in corresponding descriptions of the data processing circuit 404 and the computing module 402, and details are not described herein again.

Certainly, because the weight data includes a negative number, the computing circuit 402 may alternatively use two crossbar arrays to respectively map a weight value including a negative number and a weight value including a positive number. A specific manner is similar to that in the other approaches, and details are not described herein again. Therefore, step 3 shown in FIG. 11 may be replaced with step 4, and the preset weight data is a matrix 1002 and a matrix 1003. The matrix 1002 and the matrix 1003 are as follows:

$$\begin{bmatrix} 1 & 0 & 0 \\ 0 & 3 & 0 \\ 0 & 0 & 1 \\ 9 & 0 & 10 \end{bmatrix} \text{ and } \begin{bmatrix} 0 & 2 & 1 \\ 2 & 0 & 2 \\ 1 & 0 & 0 \\ 0 & 7 & 0 \end{bmatrix}.$$

Then, a product operation is separately performed on the third input data [0, 5, 6, 1] and the two matrices to obtain two products. A product obtained by multiplying the third input data [0, 5, 6, 1] and a matrix including a weight value of a positive number is a vector [9, 15, 16]. A product obtained by multiplying the third input data and a matrix including a weight value of a negative number is a vector [16, 7, 10]. Then, step 5 is performed to perform a subtraction operation on the two products, to obtain a calculation result [−7, 8, 6]. Either of step 3 and steps 4 and 5 may be selected for execution. FIG. 11 shows the two manners.

In the foregoing technical solutions, when the input data includes a negative number, the negative number in the input data is converted into a non-negative number through translation processing, so that a requirement of the crossbar array on a value of the input data can be met. In addition, because a value of each element in the input data is not a negative number, it is not required for a computing array to perform calculation for a plurality of times, thereby improving neural network computing efficiency, and reducing a delay of a neural network operation. Further, because it is not required for the computing array to perform calculation for a plurality of times, computing resource consumption may also be reduced.

Figure 12:
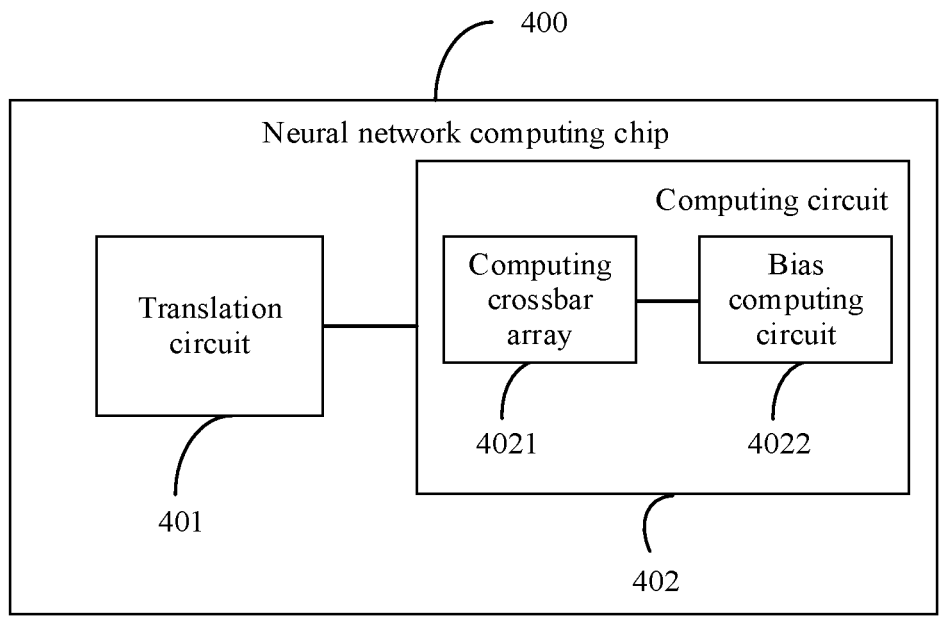
FIG. 12 is a schematic diagram of another example of a computing circuit according to an embodiment of this application.

Manner 2:

Refer to FIG. 12. The computing circuit 402 includes a computing crossbar array 4021 and a bias computing circuit 4022.

The computing crossbar array 4021 stores initial weights of the computing chip. After receiving the second input data processed by the translation circuit 401, the computing crossbar array 4021 performs a product operation on the second input data and initial weights stored in the computing crossbar array 4021 to obtain a first intermediate result, and then outputs the first intermediate result to the bias computing circuit 4022. The computing crossbar array 4021 may be the crossbar array shown in FIG. 3, and a weight value of the initial weight data is stored in a cell of the crossbar array.

After receiving the first intermediate result output by the computing crossbar array 4021, the bias computing circuit 4022 performs calculation on the first intermediate result based on stored bias data, to obtain a calculation result of the neural network layer. The bias computing circuit 4022 may include a summator, the summator stores the bias data, and the summator is configured to perform a summation operation on each element in the first intermediate result and a corresponding element in the bias data. For example, the summator sums the first element in the first intermediate result and the first element in the bias data, sums the second element in the first intermediate result and the second element in the bias data, and so on, to obtain a calculation result.

Because the second input data input into the computing circuit 402 is data obtained after translation processing, an output bias is caused. To eliminate the output bias, in this embodiment of this application, the bias data stored in the bias computing circuit 4022 is improved. The preset bias data is obtained based on the translation data in the translation circuit 401, the initial weights, and the initial bias data. Further, calculation is performed on the translation data by using the initial weights to obtain a calculation result. Then, a subtraction operation is performed on initial bias data of the computing node and the calculation result to obtain processed bias data, and the processed bias data is stored into the bias computing circuit 4022. In other words, the bias data stored in the bias computing circuit 4022 is the processed bias data instead of the initial bias data of the computing chip. For a calculation process of the processed bias data, refer to corresponding content in FIG. 8. Details are not described herein again.

In addition, the computing circuit 402 in manner 2 may further include an ADC and a DAC. A specific arrangement manner is similar to the arrangement manner of the ADC and the DAC in manner 1, and details are not described herein again.

Based on a same invention concept, an embodiment of this application provides a neural network computing method. The method is applied to a neural network computing chip 400 including a translation module 401 and the computing circuit 402 shown in FIG. 12.

Figure 13:
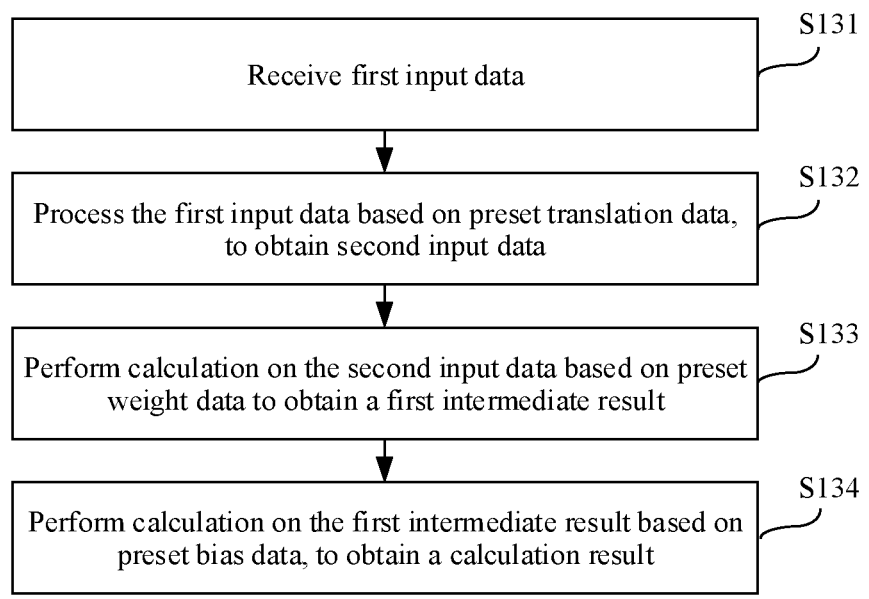
FIG. 13 is a flowchart of another example of a data processing method according to an embodiment of this application.

FIG. 13 is a flowchart of a neural network computing method according to an embodiment of this application. The flowchart is described as follows.

S131: The neural network computing chip 400 receives first input data.

S132: The neural network computing chip 400 processes the first input data based on preset translation data, to obtain second input data.

Step S131 to step S132 are similar to step S101 to step S102, and details are not described herein again.

Figure 14:
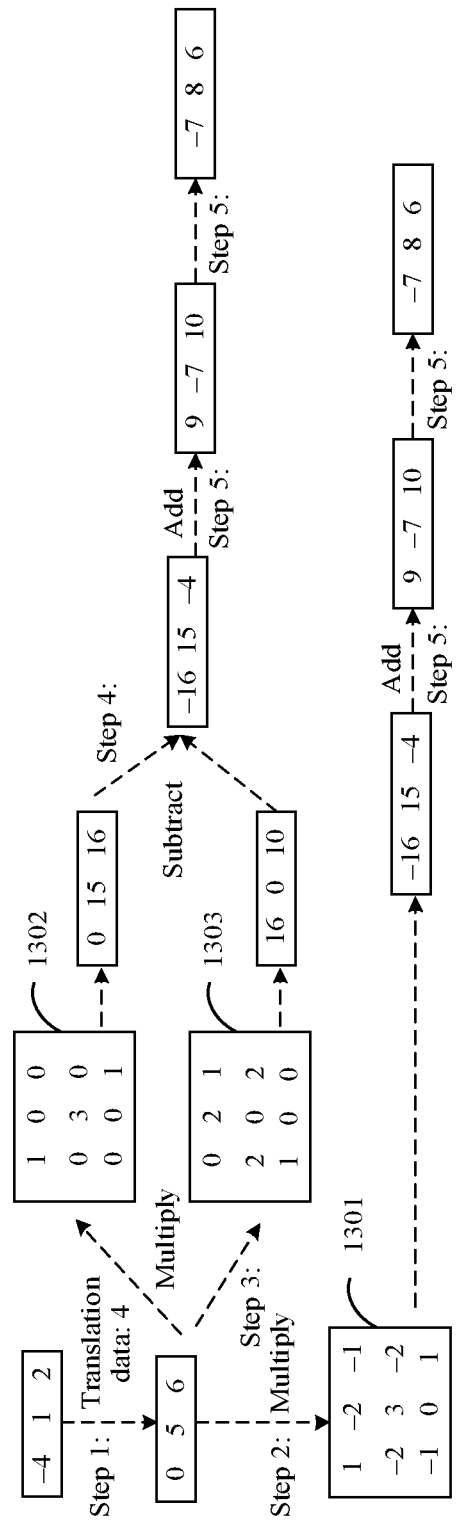
FIG. 14 is a schematic diagram of another example of a data processing method according to an embodiment of this application.

In an example, FIG. 14 is a schematic diagram of processing the first input data by the neural network computing chip 400. In FIG. 14, the first input data is a vector [−4, 1, 2]. After receiving the first input data, the neural network computing chip 400 performs step 1 in FIG. 14, and performs translation processing on the first input data by using the translation data (for example, the translation data is 4) stored in the translation circuit 401, to obtain the second input data: a vector [0, 5, 6].

S133: The neural network computing chip 400 performs calculation on the second input data based on preset weight data, to obtain a first intermediate result.

After the translation circuit 401 of the neural network computing chip 400 outputs the second input data, the computing circuit 402 performs calculation on the second input data based on preset initial weights. For example, as shown in step 2 shown in FIG. 14, the preset weight data is a matrix 1301:

$$\begin{bmatrix} 1 & -2 & -1 \\ -2 & 3 & -2 \\ -1 & 0 & 1 \end{bmatrix}$$

A product operation is performed on the second input data [0, 5, 6] and the matrix to obtain the first intermediate result: a vector [−16, 15, −4]. Similar to step S103, when the computing circuit 402 uses two crossbar arrays to map weight data, step 2 in FIG. 14 may be replaced with step 3, and therefore the weight data stored in the computing circuit 402 is a matrix 1302 and a matrix 1303. The matrix 1302 and the matrix 1303 are as follows:

$$\begin{bmatrix} 1 & 0 & 0 \\ 0 & 3 & 0 \\ 0 & 0 & 1 \end{bmatrix} \text{ and } \begin{bmatrix} 0 & 2 & 1 \\ 2 & 0 & 2 \\ 1 & 1 & 1 \end{bmatrix}$$

Then, a product operation is separately performed on the second input data [0, 5, 6] and the two matrices to obtain two products. A product obtained by multiplying the second input data [0, 5, 6, 1] and a matrix including a weight value of a positive number is a vector [0, 15, 6]. A product obtained by multiplying the second input data and a matrix including a weight value of a negative number is a vector [16, 0, 10]. Then, step 4 is performed to perform a subtraction operation on the two products, to obtain a first intermediate result: [−16, 15, −4]. Either of step 2 and steps 3 and 4 may be selected for execution. FIG. 14 shows the two manners.

S134: The neural network computing chip 400 performs calculation on the first intermediate result based on preset bias data, to obtain a calculation result.

After obtaining the first intermediate result, the computing circuit 402 performs an addition operation on the first intermediate result by using the preset bias data. As shown in step 5 in FIG. 14, the preset bias data is a vector [9, −7, 10]. Each element in the first intermediate result and a corresponding element in the bias data are added up, so that the calculation result is a vector [−7, 8, 6].

In the foregoing technical solutions, when the input data includes a negative number, the negative number in the input data is converted into a non-negative number through translation processing, so that a requirement of the crossbar array on a value of the input data can be met. In addition, because a value of each element in the input data is not a negative number, it is not required for two computing arrays to perform calculation, thereby improving neural network computing efficiency, and reducing a delay of a neural network operation. Further, because a plurality of computing arrays is not required, computing resource consumption may also be reduced.

In the embodiments provided in this application, to implement functions in the methods provided in the embodiments of this application, a storage system may include a hardware structure and/or a software module, and the foregoing functions are implemented in a form of a hardware structure, a software module, or both a hardware structure and a software module. Whether a function in the foregoing functions is performed in a form of a hardware structure, a software module, or both a hardware structure and a software module depends on specific application and design constraint conditions of the technical solutions.

An embodiment of this application further provides a computer readable storage medium, including an instruction. When the instruction is run on a computer, the computer is enabled to perform the method performed by the neural network computing chip 400 in the embodiment shown in FIG. 10 or FIG. 13.

An embodiment of this application further provides a computer program product, including an instruction. When the instruction is run on a computer, the computer is enabled to perform the method performed by the neural network computing chip 400 in the embodiment shown in FIG. 10 or FIG. 13.

An embodiment of this application provides a neural network system. The neural network system includes the neural network computing chip 400 in the embodiment shown in FIG. 4, FIG. 5A, FIG. 5B, or FIG. 7.

All or a part of the foregoing method in the embodiments of this application may be implemented by means of software, hardware, firmware, or any combination thereof. When software is used to for implementation, the method may be implemented partially in a form of a computer program product. The computer program product includes one or more computer instructions. When the computer program instruction is loaded and executed on a computer, the procedure or functions according to the embodiments of this application are completely or partially generated. The computer may be a general-purpose computer, a special-purpose computer, a computer network, a network device, user equipment, or another programmable apparatus. The computer instruction may be stored in a computer-readable storage medium or may be transmitted from one computer-readable storage medium to another computer-readable storage medium. For example, the computer instruction may be transmitted from one web site, computer, server, or data center to another website, computer, server, or data center in a wired (for example, through a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center including one or more usable media integrated. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

What is claimed is:

1. A neural network computing chip, comprising:
   a translation circuit configured to:
      receive first input data comprising at least two elements, wherein a first value of at least one element of the at least two elements is a negative number; and
      process, based on preset translation data, the first input data to obtain second input data, wherein a second value of an element comprised in the second input data is zero or a positive number; and
   a computing circuit coupled to the translation circuit and configured to:
      receive third input data comprising the second input data and preset bias input data; and
      perform, based on preset weight data, a calculation on the third input data to obtain a calculation result, wherein the preset weight data comprise bias weights of the neural network computing chip and initial weights of the neural network computing chip, and wherein the bias weights and the preset bias input data are based on the preset translation data, the initial weights, and initial bias data of the neural network computing chip.

2. The neural network computing chip of claim 1, further comprising a register coupled to the translation circuit and configured to store the preset translation data, wherein the translation circuit is further configured to:
   receive the preset translation data; and
   separately perform a summation operation on each element in the first input data and the preset translation data to obtain the second input data.

3. The neural network computing chip of claim 1, further comprising a register configured to store the preset translation data, wherein the translation circuit comprises:
   a summator coupled to the register and configured to:
      receive the preset translation data; and
      perform a summation operation on each element in the first input data and the preset translation data to obtain intermediate data; and
   a comparator coupled to the summator and configured to compare each element in the intermediate data with a preset value to obtain the second input data.

4. The neural network computing chip of claim 3, wherein the register is further configured to store the preset bias input data, wherein the neural network computing chip further comprises a data processing circuit coupled to the translation circuit, the computing circuit, and the register and configured to obtain the third input data based on the second input data and the preset bias input data.

5. The neural network computing chip of claim 1, wherein the computing circuit is further configured to:
   perform calculation based on the preset translation data, the initial weights, and the initial bias data to obtain processed bias data;
   determine, based on a range of input data of the computing circuit and a data range of the initial weights, a preset rule; and
   obtain the bias weights and the preset bias input data by splitting the processed bias data according to the preset rule.

6. The neural network computing chip of claim 1, wherein the computing circuit comprises a computing crossbar array comprising a plurality of computing components, and wherein each of the computing components comprises a resistive memory computing component.

7. The neural network computing chip of claim 6, wherein the resistive memory computing component comprises a resistive random-access memory (ReRAM).

8. The neural network computing chip of claim 6, wherein the resistive memory computing component comprises a phase change memory (PCM).

9. The neural network computing chip of claim 6, wherein the resistive memory computing component comprises a flash memory.

10. A neural network computing chip comprising:
    a translation circuit configured to:
       receive first input data comprising at least two elements, wherein a first value of at least one element of the at least two elements is a negative number; and
       process, based on preset translation data, the first input data to obtain second input data, wherein a second value of an element comprised in the second input data is zero or a positive number; and a computing circuit coupled to the translation circuit and configured to:
  receive the second input data;
  perform a first calculation on the second input data based on preset initial weights to obtain an intermediate result; and
  perform a second calculation on the intermediate result based on preset bias data to obtain a calculation result,
  wherein the preset bias data is based on the preset translation data, the preset initial weights, and initial bias data of the neural network computing chip.

11. The neural network computing chip of claim 10, further comprising a register coupled to the translation circuit and configured to store the preset translation data, wherein the translation circuit is further configured to:
  receive the first input data and the preset translation data; and
  separately perform a summation operation on each element in the first input data and the preset translation data to obtain the second input data.

12. The neural network computing chip of claim 10, further comprising a register configured to store the preset translation data, wherein the translation circuit comprises:
  a summator coupled to the register and configured to:
    receive the first input data and the preset translation data; and
    perform a summation operation on each element in the first input data and the preset translation data to obtain intermediate data; and
  a comparator coupled to the summator and configured to compare each element in the intermediate data with a preset value to obtain the second input data.

13. The neural network computing chip of claim 10, wherein the computing circuit comprises:
  a computing crossbar array comprising a plurality of resistive memory computing components, coupled to the translation circuit, and configured to:
    receive the second input data; and
    perform the first calculation on the second input data based on the preset initial weights to obtain the intermediate result; and
  a bias computing circuit coupled to the computing crossbar array and configured to:
    receive the intermediate result; and
    perform the second calculation on the intermediate result based on the preset bias data to obtain the calculation result.

14. The neural network computing chip of claim 13, wherein the resistive memory computing components comprise a resistive random-access memory (ReRAM).

15. The neural network computing chip of claim 13, wherein the resistive memory computing components comprise a phase change memory (PCM).

16. The neural network computing chip of claim 13, wherein the resistive memory computing components comprise a flash memory.

17. A neural network computing method implemented by a neural network computing chip, wherein the neural network computing method comprises:
  receiving first input data comprising at least two elements, wherein a first value of at least one element of the at least two elements is a negative number;
  processing the first input data based on preset translation data to obtain second input data, wherein a second value of an element comprised in the second input data is zero or a positive number; and
  performing, based on preset weight data, a calculation on third input data to obtain a calculation result, wherein the third input data comprises the second input data and preset bias input data,
  wherein the preset weight data comprises bias weights of the neural network computing chip and initial weights of the neural network computing chip, and
  wherein the bias weights and the preset bias input data based on the preset translation data, the initial weights, and initial bias data of the neural network computing chip.

18. The neural network computing method of claim 17, further comprising performing a summation operation on each element in the first input data and the preset translation data to obtain the second input data.

19. The neural network computing method of claim 17, further comprising:
  performing a summation operation on each element in the first input data and the preset translation data to obtain intermediate data; and
  comparing each element in the intermediate data with a preset value to obtain the second input data.

20. The neural network computing method of claim 17, further comprising:
  performing calculation based on the preset translation data, the initial weights, and the initial bias data to obtain processed bias data;
  determine, based on a range of input data of the neural network computing chip and a data range of the initial weights, a preset rule; and
  obtain the bias weights and the preset bias input data by splitting the processed bias data according to the preset rule.

* * * * *